(12) United States Patent
Tait

(10) Patent No.: US 8,104,189 B2
(45) Date of Patent: Jan. 31, 2012

(54) COORDINATE MEASUREMENT MACHINE WITH VIBRATION DETECTION

(75) Inventor: Hogar Tait, Carlsbad, CA (US)

(73) Assignee: Hexagon Metrology AB, Nacka Strand (SE)

( * ) Notice: Subject to any disclaimer, the term of this patent is extended or adjusted under 35 U.S.C. 154(b) by 0 days.

(21) Appl. No.: 12/825,185

(22) Filed: Jun. 28, 2010

(65) Prior Publication Data

US 2010/0325907 A1    Dec. 30, 2010

Related U.S. Application Data

(60) Provisional application No. 61/221,973, filed on Jun. 30, 2009.

(51) Int. Cl.
*G01B 5/004* (2006.01)
(52) U.S. Cl. ............................................. 33/503; 33/702
(58) Field of Classification Search .................. 33/503, 33/556, 559, 702, 703
See application file for complete search history.

(56) References Cited

U.S. PATENT DOCUMENTS

| | | |
|---|---|---|
| 4,333,238 A | 6/1982 | McMurtry |
| 4,588,339 A | 5/1986 | Bilz |
| 4,782,598 A | 11/1988 | Guarini |
| 4,972,090 A | 11/1990 | Eaton |
| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,396,712 A | 3/1995 | Herzog |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,526,576 A | 6/1996 | Fuchs et al. |
| 5,528,505 A | 6/1996 | Granger et al. |
| 5,579,246 A | 11/1996 | Ebersbach et al. |
| 5,611,147 A | 3/1997 | Raab |
| 5,615,489 A | 4/1997 | Breyer et al. |

(Continued)

FOREIGN PATENT DOCUMENTS

DE      4345091      7/1995

(Continued)

OTHER PUBLICATIONS

International Search Report and Written Opinion, PCT/US2010/040248 dated Jan. 5, 2011.

*Primary Examiner* — G. Bradley Bennett
(74) *Attorney, Agent, or Firm* — Knobbe, Martens, Olson & Bear, LLP

(57) ABSTRACT

An articulated arm system can include an articulated measuring arm with a plurality of interconnected support arm segments. The arm segments can be moveable about a plurality of axes. A plurality of rotational angle sensors can mount on the arm and be configured to measure rotational position between the support arm segments. Additionally, a vibration detection device can attach to the arm near an end of the arm. The vibration detection device can be operatively connected to the sensors such that the sensors output a rotational position upon detection of a new vibration exceeding a threshold amplitude.

28 Claims, 6 Drawing Sheets

U.S. PATENT DOCUMENTS

| | | | |
|---|---|---|---|
| 5,757,499 | A | 5/1998 | Eaton |
| 5,768,792 | A | 6/1998 | Raab |
| 5,778,549 | A | 7/1998 | Campanile |
| 5,794,356 | A | 8/1998 | Raab |
| 5,822,450 | A | 10/1998 | Arakawa et al. |
| 5,829,148 | A | 11/1998 | Eaton |
| 5,978,748 | A | 11/1999 | Raab |
| 5,991,704 | A | 11/1999 | Rekar et al. |
| 6,044,569 | A | 4/2000 | Ogihara et al. |
| 6,134,506 | A | 10/2000 | Rosenberg et al. |
| 6,161,079 | A | 12/2000 | Zink et al. |
| 6,166,811 | A | 12/2000 | Long et al. |
| 6,219,928 | B1 | 4/2001 | Raab et al. |
| 6,301,796 | B1 | 10/2001 | Cresson |
| 6,360,176 | B1 | 3/2002 | Nishioki et al. |
| 6,366,831 | B1 | 4/2002 | Raab |
| 6,412,329 | B1 | 7/2002 | Nai |
| 6,457,366 | B1 | 10/2002 | Hidaka et al. |
| 6,487,896 | B1 | 12/2002 | Dall'Aglio |
| 6,526,670 | B1 | 3/2003 | Carli |
| 6,535,794 | B1 | 3/2003 | Raab |
| 6,598,306 | B2 | 7/2003 | Eaton |
| 6,611,346 | B2 | 8/2003 | Granger |
| 6,611,617 | B1 | 8/2003 | Crampton |
| 6,612,044 | B2 | 9/2003 | Raab et al. |
| 6,618,496 | B1 | 9/2003 | Tassakos et al. |
| 6,668,466 | B1 | 12/2003 | Bieg et al. |
| 6,759,648 | B2 | 7/2004 | Baxter et al. |
| 6,817,108 | B2 | 11/2004 | Eaton |
| 6,868,356 | B2 | 3/2005 | Nai et al. |
| 6,892,465 | B2 | 5/2005 | Raab et al. |
| 6,904,691 | B2 | 6/2005 | Raab et al. |
| 6,925,722 | B2 | 8/2005 | Raab et al. |
| 6,931,745 | B2 | 8/2005 | Granger |
| 6,952,882 | B2 | 10/2005 | Raab et al. |
| 6,984,236 | B2 | 1/2006 | Raab |
| 6,988,322 | B2 | 1/2006 | Raab et al. |
| 7,003,892 | B2 | 2/2006 | Eaton et al. |
| 7,017,275 | B2 | 3/2006 | Raab et al. |
| 7,043,847 | B2 | 5/2006 | Raab et al. |
| 7,047,109 | B2 | 5/2006 | Ogura et al. |
| 7,051,450 | B2 | 5/2006 | Raab et al. |
| 7,073,271 | B2 | 7/2006 | Raab et al. |
| 7,096,077 | B2 | 8/2006 | Price et al. |
| 7,152,456 | B2 | 12/2006 | Eaton |
| 7,174,651 | B2 | 2/2007 | Raab et al. |
| 7,246,030 | B2 | 7/2007 | Raab et al. |
| 7,269,910 | B2 | 9/2007 | Raab et al. |
| 7,286,949 | B2 | 10/2007 | McFarland et al. |
| 7,296,363 | B2 * | 11/2007 | Danisch et al. ................. 33/556 |
| 7,296,364 | B2 | 11/2007 | Seitz et al. |
| 7,296,979 | B2 | 11/2007 | Raab et al. |
| 7,372,581 | B2 | 5/2008 | Raab et al. |
| 7,395,606 | B2 | 7/2008 | Crampton |
| 7,441,341 | B2 | 10/2008 | Eaton |
| 7,525,276 | B2 | 4/2009 | Eaton |
| 7,546,689 | B2 | 6/2009 | Ferrari et al. |
| 7,568,293 | B2 | 8/2009 | Ferrari |
| 7,578,069 | B2 | 8/2009 | Eaton |
| D599,226 | S | 9/2009 | Gerent et al. |
| 7,624,510 | B2 | 12/2009 | Ferrari |
| 7,640,674 | B2 | 1/2010 | Ferrari et al. |
| 7,676,945 | B2 | 3/2010 | Prestidge et al. |
| 7,693,325 | B2 | 4/2010 | Pulla et al. |
| 7,735,234 | B2 | 6/2010 | Briggs et al. |
| 7,743,524 | B2 | 6/2010 | Eaton et al. |
| 7,774,949 | B2 | 8/2010 | Ferrari |
| 7,779,548 | B2 | 8/2010 | Ferrari |
| 7,805,854 | B2 | 10/2010 | Eaton |
| 2006/0100610 | A1 | 5/2006 | Wallace |
| 2007/0066873 | A1 | 3/2007 | Kamath et al. |
| 2008/0016711 | A1 | 1/2008 | Baebler |
| 2008/0109126 | A1 | 5/2008 | Sandin |
| 2008/0235970 | A1 * | 10/2008 | Crampton ....................... 33/503 |
| 2009/0024355 | A1 * | 1/2009 | Negishi ......................... 702/168 |
| 2009/0241360 | A1 | 10/2009 | Tait et al. |
| 2010/0095542 | A1 | 4/2010 | Ferrari |

FOREIGN PATENT DOCUMENTS

| | | |
|---|---|---|
| DE | 10112977 | 11/2002 |
| EP | 0522610 | 1/1993 |
| FR | 2740546 | 4/1997 |
| GB | 2274526 | 7/1994 |
| JP | 05-031685 | 2/1993 |
| JP | 2003-021133 | 1/2003 |
| JP | 2003-175484 | 6/2003 |
| WO | WO 98/08050 | 2/1998 |

* cited by examiner

COORDINATE MEASUREMENT MACHINE WITH VIBRATION DETECTION

CROSS-REFERENCE TO RELATED APPLICATIONS

This application claims the priority benefit under 35 U.S.C. §119(e) to U.S. Provisional Patent Application Ser. No. 61/221,973 (filed Jun. 30, 2009), the entirety of which is hereby expressly incorporated by reference herein.

BACKGROUND OF THE INVENTION

1. Field of the Invention

The present application relates to measuring devices, more specifically to coordinate measurement machines.

2. Description of the Related Art

Portable coordinate measurement machines (PCMMs) such as articulated arm PCMMs can be used to perform a variety of measurement and coordinate acquisition tasks. In one common commercially-available PCMM, an articulated arm having three transfer members connected by articulating joints allows easy movement of a probe head or tip about seven axes to take various measurements. In operation, when the probe head or tip contacts an object the PCMM outputs to a processing unit data regarding the orientation of the transfer members and articulating joints on the articulated arm. This data would then be translated into a measurement of a position at the probe head or tip.

Typical uses for such devices generally relate to manufacturing inspection and quality control. In these applications, measurements are typically taken only when a measuring point on the arm is in contact with an article to be measured. Contact can be indicated by strain-gauges, static charge, or user-input. Such devices have been commercially successful. Still there is a general need to continue to increase the accuracy of such instruments.

SUMMARY OF THE INVENTION

As described in further detail herein, systems and methods are disclosed overcoming the shortcomings of the prior art and having certain advantages. Using strain-gauges to indicate contact can be problematic where the deflection of the gauge introduces additional error to a measurement of the position. Static charge might not be available in all applications. User-input may introduce error, as there may be additional delay between initial contact and user-input, and further in that the user-input itself (e.g. actuating a button) may cause further movement of the PCMM. Further, devices that generate their own vibrations add error to their measurements. In light of the prior methods discussed above, there is a need for a superior system and method for detecting contact.

In one embodiment an articulated arm system can include an articulated measuring arm with a plurality of interconnected support arm segments. The arm segments can be moveable about a plurality of axes. A plurality of rotational angle sensors can mount on the arm and be configured to measure rotational position between the support arm segments. Additionally, a vibration detection device can attach to the arm near an end of the arm. The vibration detection device can be operatively connected to the sensors such that the sensors output a rotational position upon detection of a new vibration exceeding a threshold amplitude.

In another embodiment a method of operating an articulated arm system is provided. An item to be measured can be contacted with an articulated measuring arm. The arm can include a plurality of interconnected support arm segments moveable about a plurality of axes. Upon contact with the item, a new vibration can be sensed at an end of the measuring arm. In response to the new vibration, a triggering signal can be generated. In response to the triggering signal, a position of the end of the measuring arm can be automatically measured. In some embodiments the step of automatically measuring can include sensors outputting the rotational position of the support arm segments. In other embodiments, the step can also include storing or processing the outputted rotational positions.

In a further embodiment, a probe is configured for use with a coordinate measurement machine. The probe can include a probe tip which includes an accelerometer mounted within it. The probe tip can connect to a probe body via a probe neck. Further, a mounting portion can mount the probe body to a coordinate measuring machine. The mounting portion can include a connect device and a data port. The connect device can form an interengaging structure with a coordinate measuring machine to form a physical connection. The data port can provide data transfer between the probe and the coordinate measuring machine.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF THE PREFERRED EMBODIMENTS

The following detailed description presents various descriptions of certain embodiments of the present teachings described herein. However, the inventive scope of the present teachings can be embodied in a multiplicity of different ways as defined and covered by the claims. In this description, reference is made to the drawings wherein like parts are designated with like numerals throughout.

Figure 1:
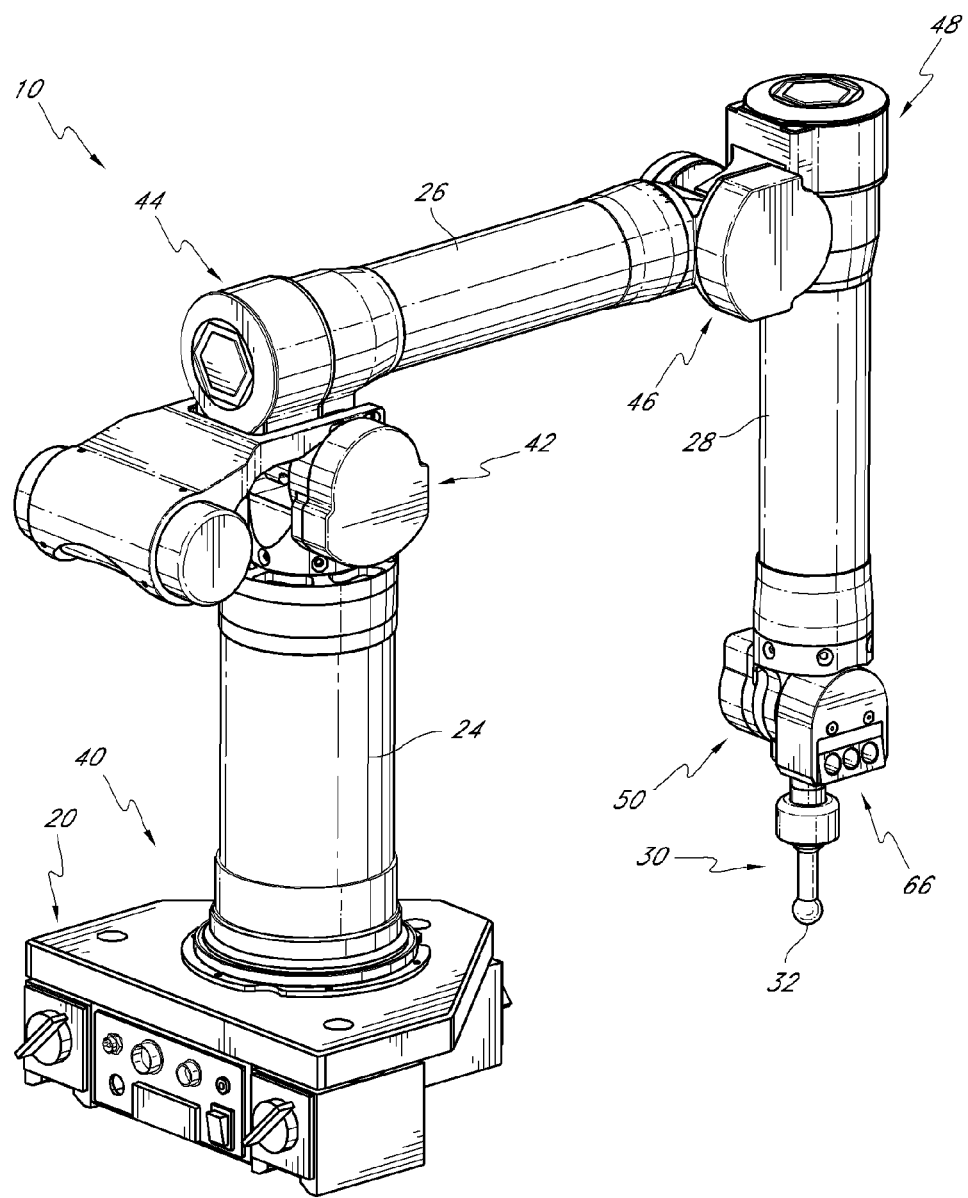
FIG. 1 is a perspective view of an embodiment of a coordinate measuring machine (CMM)

FIG. 1 illustrates one embodiment portable coordinate measuring machine (PCMM) 10. While the illustrated embodiment is a portable coordinate measuring machine, it should be appreciated that certain embodiments can be applied in the context of a non or semi portable CMM. In the illustrated embodiment, the PCMM 10 comprises a base 20, a plurality of rigid transfer members 24, 26, 28, a coordinate acquisition member 30 and a plurality of articulation members 40, 42, 44, 46, 48, 50 connecting the rigid transfer members 24, 26, 28 to one another. Each articulation member is configured to impart one or more rotational and/or angular degrees of freedom. Through the various articulation members 40, 42, 44, 46, 48, 50, the PCMM 10 can be aligned in various spatial orientations thereby allowing fine positioning of the coordinate acquisition member 30 in three dimensional space.

The position of the rigid transfer members 24, 26, 28 and the coordinate acquisition member 30 may be adjusted using manual, robotic, semi-robotic and/or any other adjustment method. In one embodiment, the PCMM 10, through the various articulation members, is provided with seven rotary axes of movement. It will be appreciated, however, that there is no strict limitation to the number of axes of movement that may be used, and fewer or additional axes of movement may be incorporated into the PCMM design.

In various embodiments, the coordinate acquisition member 30 comprises a contact sensitive member or contact probe 32 configured to engage the surfaces of a selected object and generate coordinate data on the basis of probe contact. In some embodiments, the contact probe 32 can be a hard probe, which can be substantially rigid and solid. Devices or modules for detecting and/or indicating contact can be disposed outside the hard probe, as discussed further below. As also discussed further below, the probe contact can be indicated by a detected vibration on, near, or within the probe. In further embodiments, the coordinate acquisition member 30 may additionally comprise other methods and devices for detecting position such as a remote scanning and detection component that does not necessarily require direct contact with the selected object to acquire geometry data. In one embodiment, a laser coordinate detection device (e.g., laser camera) may be used to obtain geometry data without direct object contact. It will be appreciated that various coordinate acquisition member methods and devices for detecting position and/or contact including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive may also be combined with a vibration detection probe (as described below) for the purposes of coordinate acquisition.

In other embodiments, one or more of the rigid transfer members 24, 26, 28 comprise a composite structure that includes an inner portion and an outer exoskeletal portion. In such an arrangement, the inner portion of the rigid transfer members 24, 26, 28 are interconnected to one another through articulation members that provide the ability to position the coordinate acquisition member 30 in a variety of different orientations in three dimensional space. The outer portions surrounding the various inner portions of the rigid transfer members 24, 26, 28 form an environmental barrier that at least partially encloses segments of the inner portions. In one aspect, the inner portions are configured to "float" inside the corresponding outer portions.

As is known in the art, the position of the probe 32 in space at a given instant can be calculated by knowing the length of each member and the specific position of each of the articulation members 40, 42, 44, 46, 48, 50. Each of the articulation members 40, 42, 44, 46, 48, 50 can be broken down into a singular rotational degree of motion, each of which is measured using a dedicated rotational transducer. Each transducer outputs a signal (e.g., an electrical signal), which varies according to the movement of the 40, 42, 44, 46, 48, 50 in its degree of motion. The signal can be carried through wires or otherwise transmitted to the base 20. From there, the signal can be processed and/or transferred to a computer for determining and recording the position of the probe 32 in space.

In one embodiment, the transducer can comprise an optical encoder. In general, each encoder measures the rotational position of its axle by coupling is movement to a pair of internal wheels having successive transparent and opaque bands. In such embodiments, light can be shined through the wheels onto optical sensors which feed a pair of electrical outputs. As the axle sweeps through an arc, the output of the analog encoder can be substantially two sinusoidal signals which are 90 degrees out of phase. Coarse positioning can occur through monitoring the change in polarity of the two signals. Fine positioning can be determined by measuring the actual value of the two signals at the instant in question. In certain embodiments, maximum accuracy can be obtained by measuring the output precisely before it is corrupted by electronic noise. Additional details and embodiments of the illustrated embodiment of the CMM 10 can be found in U.S. Pat. No. 5,829,148 and U.S. Patent Publication Nos. 2009-0013547 (filed 9 Jul. 2007), 2009-0013548 (filed 21 Dec. 2007) the entirety of which is hereby incorporated by reference herein.

Figure 2:
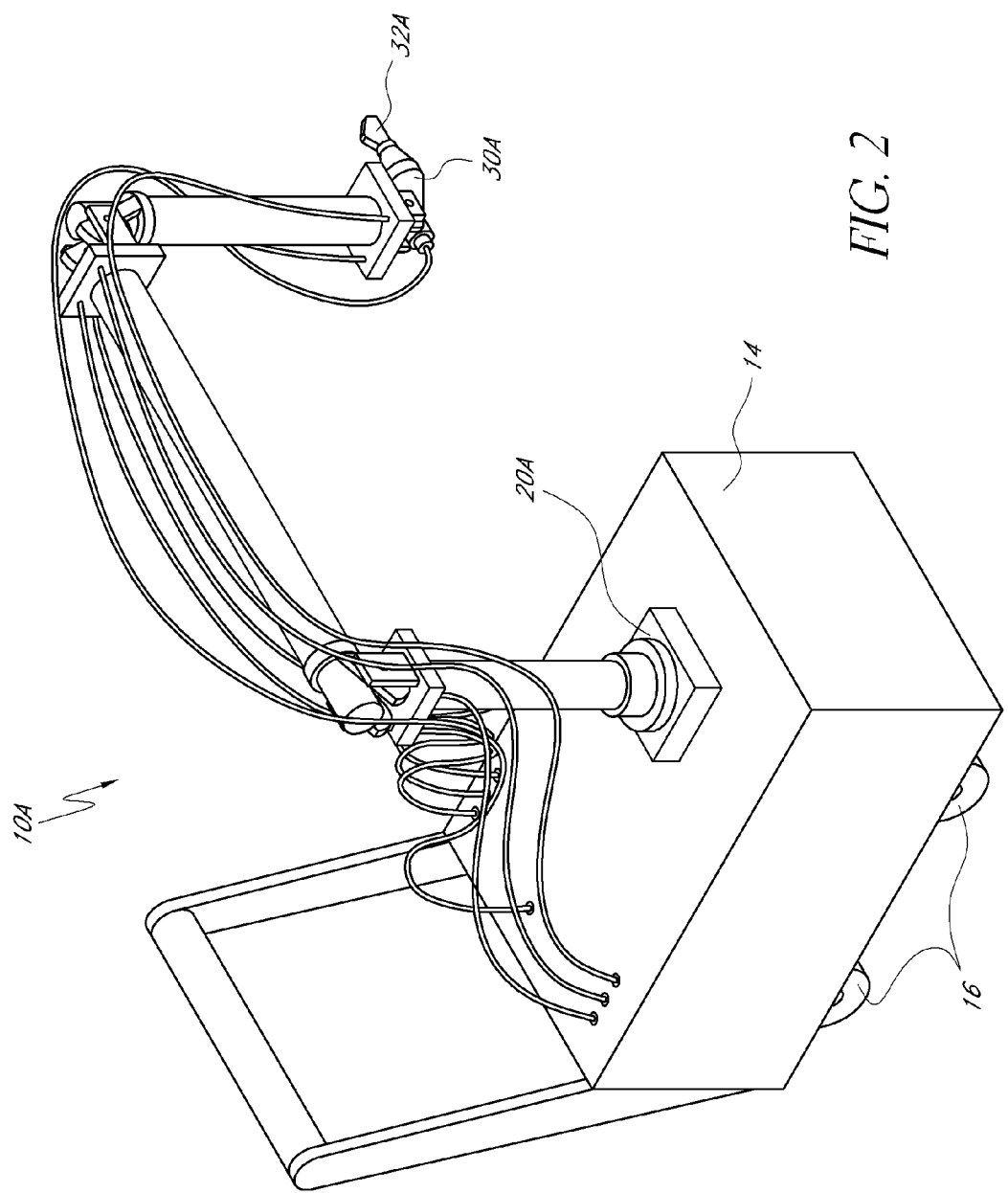
FIG. 2 is a perspective view of another embodiment of a CMM.

In one embodiment, the base 20 of the PCMM 10 may be situated on a support surface, such as a table, floor, wall or any other stable surface. In another embodiment, as shown in FIG. 2, the base 20A may be positioned on a mobile unit 14, allowing the PCMM 10A to be conveniently moved from one location to another. In such arrangements, the base 20A may be secured to the mobile unit 14 in a fixed manner (e.g. bolted, fastened or otherwise attached at one or more locations). Further, the mobile unit 14 may be configured with retractable or drop-down wheels 16 that facilitate in moving the PCMM 10A. When properly positioned at the desired location, the wheels 16 may be retracted and rigid support legs (not shown) that can used to secure the PCMM 10A in a fixed and stable position in preparation for the acquisition of coordinate data. Additional details of this embodiment of the PCMM 10 can be found in U.S. Pat. No. 7,152,456 (issued 26 Dec. 2006) the entirety of which is hereby incorporated by reference herein.

With continued reference to FIGS. 1 and 2, in various embodiments of the PCMM 10, the various devices which may be used for coordinate acquisition, such as the probe 32, may be configured to be manually disconnected and reconnected from the PCMM 10 such that a user can change probes without specialized tools. Thus, a user can quickly and easily remove one probe and replace it with another probe. Such a connection may comprise any quick disconnect or manual disconnect device. This rapid connection capability of a probe can be particularly advantageous in a PCMM that can be used for a wide variety of measuring techniques (e.g. measurements requiring physical contact of the probe with a surface followed by measurements requiring only optical contact of the probe) in a relatively short period of time. Further details regarding probes and rapid connection capability can be found in U.S. patent application Ser. No. 12/057,918 (filed 28 Mar. 2008), the entirety of which being herein incorporated by reference.

In the embodiment of FIGS. 1 and 2, the probe 30 also comprises buttons 66, which are configured to be accessible by a user. By pressing one or more of the buttons 66 singly, multiply, or in a preset sequence, the user can input various commands to the PCMM 10. In some embodiments, the buttons 66 can be used to indicate that one or more coordinate readings are ready to be recorded. In other embodiments, the buttons 66 can be used to indicate that the location being measured is a home position and that other positions should be measured relative to the home position. In still other embodiments, the buttons 66 may be used to turn on or off the PCMM 10. In other embodiments, the buttons 66 can be programmable to meet a user's specific needs. The location of the buttons 66 on the probe 30 can be advantageous in that a user need not access the base 20 or a computer in order to activate various functions of the PCMM 10 while using the probe 32 or more generally the coordinate acquisition member 30. This positioning may be particularly advantageous in embodiments of PCMM having transfer members 24, 26, or 28 that are particularly long, thus placing the base 20 out of reach for a user of the coordinate acquisition member 30. In some embodiments of the PCMM 10, any number of user input buttons (for example having more or fewer than the three illustrated in FIG. 1), can be provided, which may be placed in various other positions on the coordinate acquisition member 30 or anywhere on the PCMM 10. Other embodiments of PCMM can include other user input devices positioned on the PCMM 10 or the coordinate acquisition member 30, such as switches, rotary dials, or touch pads in place of, or in addition to user input buttons.

Figure 3:
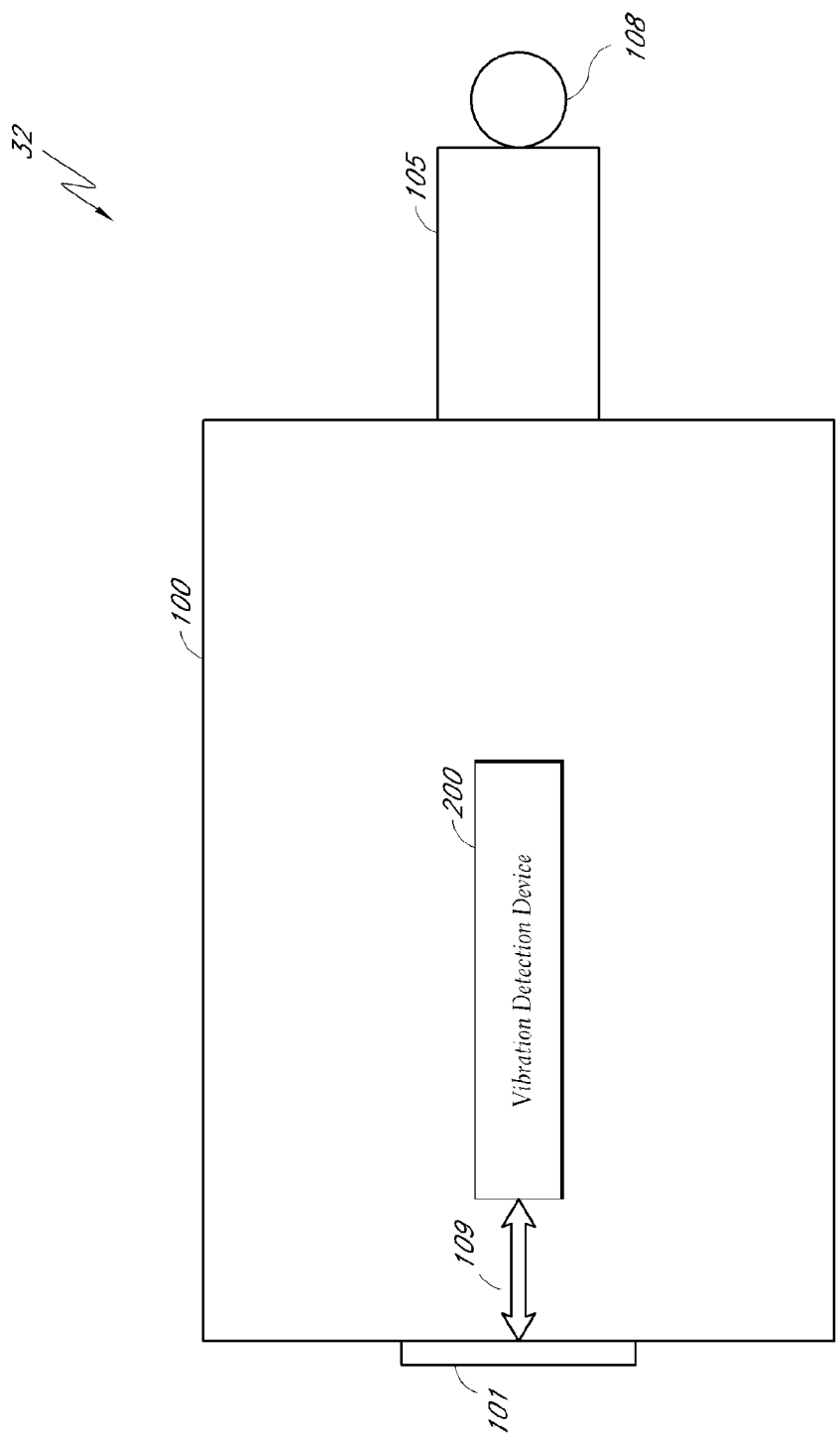
FIG. 3 is a schematic illustration of an embodiment of a probe for the CMM of FIG. 1 or 2.
Figure 4:
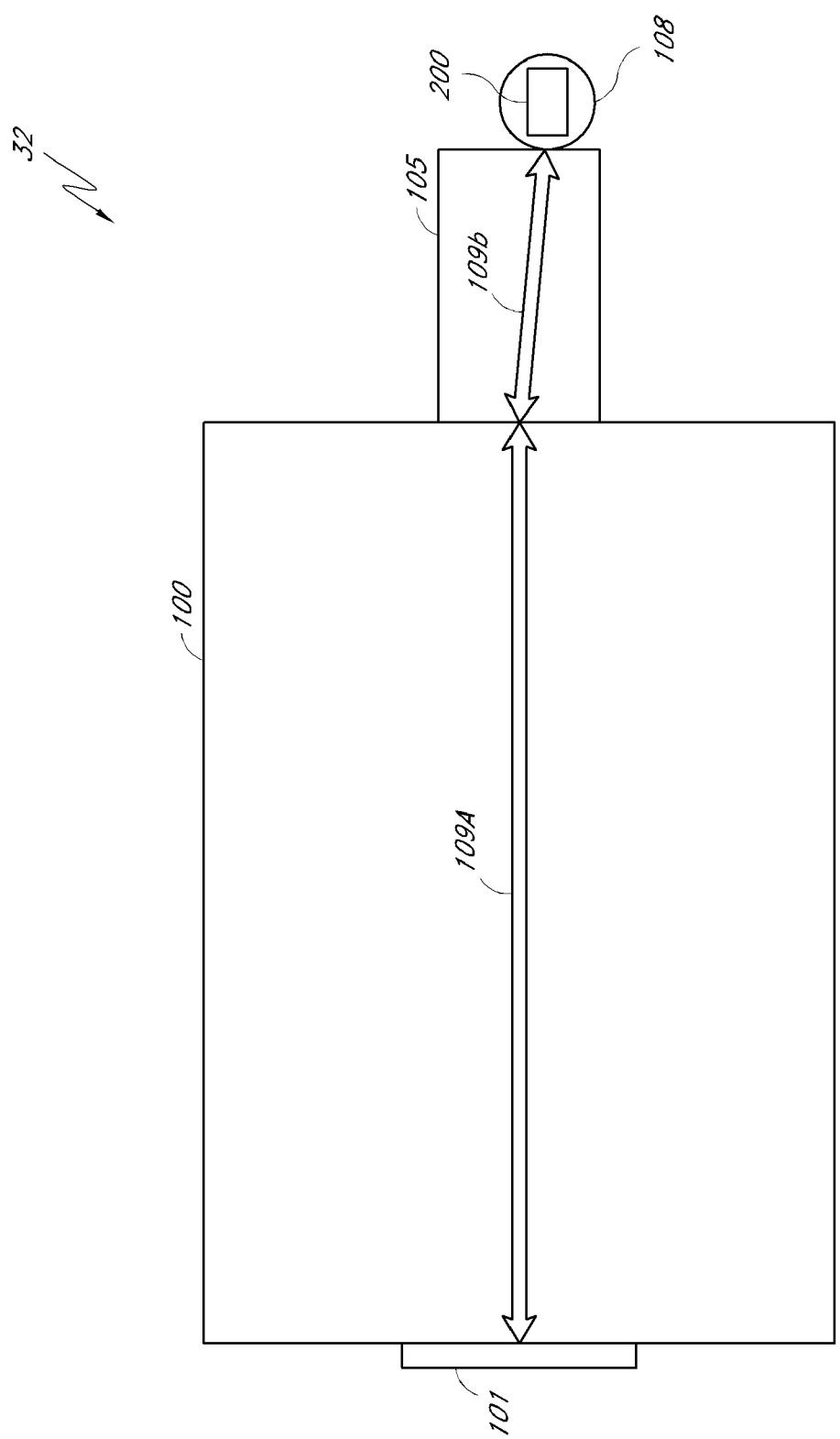
FIG. 4 is a schematic illustration of another embodiment of a probe for the CMM of FIG. 1 or 2.
Figure 5:
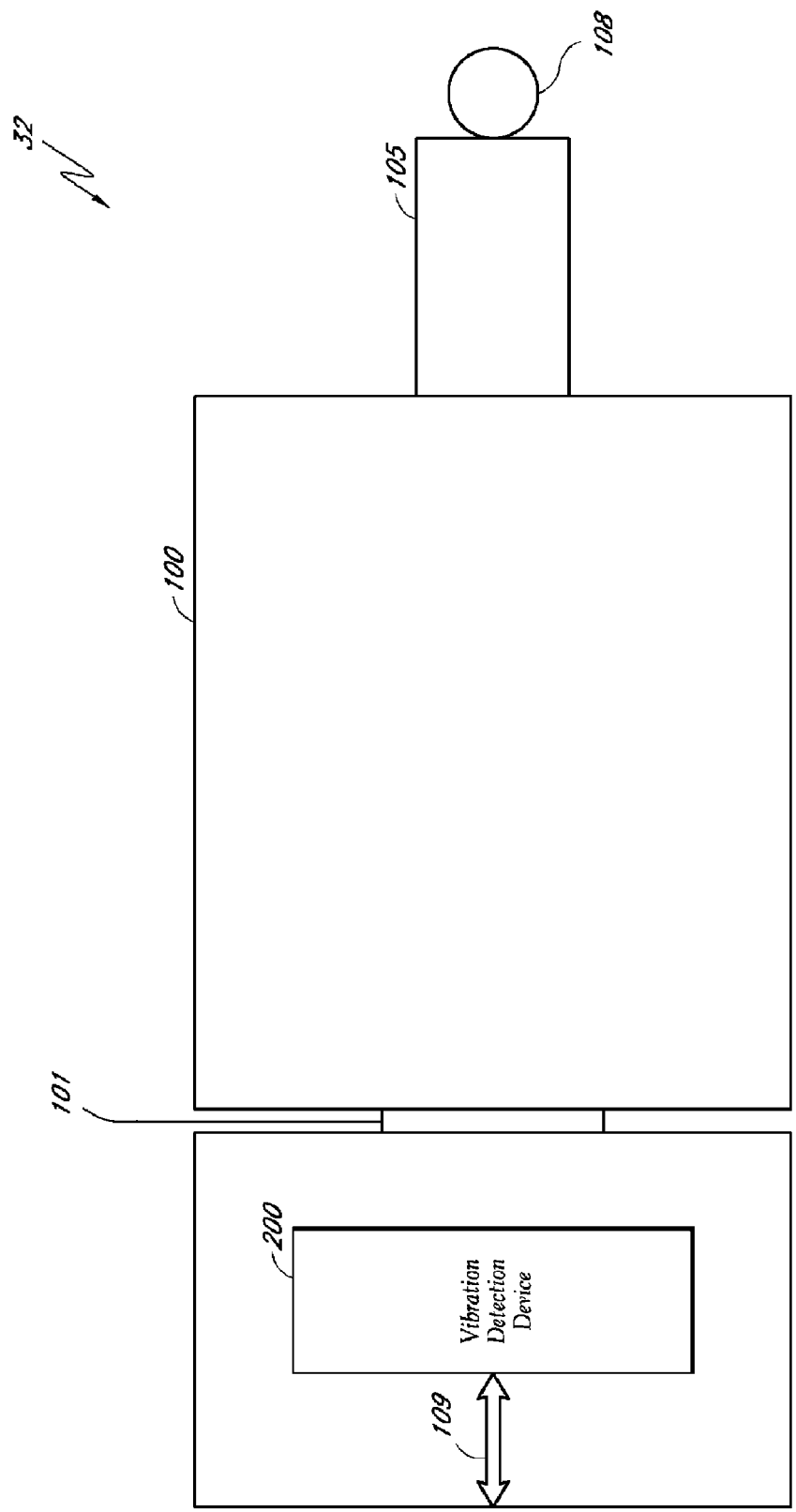
FIG. 5 is a schematic illustration of another embodiment of a probe for the CMM of FIG. 1 or 2.

FIGS. 3-5, illustrate several embodiments of probes 32 comprising modules or devices configured to provide information relating to detecting contact, as well as other capabilities. As used herein, the term "modules" or "devices" refer to logic embodied by hardware or software (including firmware), or to a combination of both hardware and software, or to a collection of software instructions. Software instructions may be embedded in firmware, such as an EPROM, and executed by a processor. It will be further appreciated that hardware modules may include connected logic units, such as gates and flip-flops, and/or may include programmable units, such as programmable gate arrays or processors. The modules described herein can be implemented as software modules, or may be represented in hardware or firmware. Generally, the modules described herein refer to logical modules that may be combined with other modules or divided into sub-modules despite their physical organization or storage.

FIG. 3 schematically illustrates one embodiment of an improved probe 32. The probe 32 comprises a probe carriage 100, a probe mount 101, a probe neck 105, and a probe tip 108. The probe carriage 100 can be a last tube of the PCMM 10, and can be configured to house various modules that, for example, sense vibration, obtain real-time data, and/or provide information relating to calibrating the probe with the PCMM, etc. The probe mount 101 is configured to attach the probe 32 to the PCMM 10, or other embodiments of PCMMs or CMMs described herein or otherwise known in the art. Similarly, the other probes described herein can also be applied to various PCMMs or CMMs. The connection provided by the probe mount 101 can be a permanent connection, a reversible connection, a rapid connection, or a similar form of connection. The probe neck 105 is configured to connect the probe tip 108 with the probe carriage 100. In some embodiments as will be discussed below, the probe neck 105 can be configured to include modules that, for example, obtain the temperature of the probe 32. In other embodiments the probe neck 105 can be substantially solid, possibly providing only a narrow bore for the passage of one or more wires. The probe tip 108 can form an end of the probe 32 and can be configured to engage surfaces of a selected object and/or generate coordinate data on the basis of probe contact as is known in the art. The probe tip 108 can typically form a circular ball or sphere, but other shapes are possible.

Still with reference to FIG. 3, the probe carriage 100 further comprises a vibration detection device 200. Although the vibration detection device 200 is described herein as an accelerometer, other methods of vibration detection known in the art can be used such as various configurations of capacitive touch sensors or MEMS microphones. In one embodiment, the accelerometer 200 can detect vibration using a structure suspended with springs having differential capacitors that provide a signal indicative of the position of the structure, and accordingly the deflection of the springs. In an additional embodiment the accelerometer 200 comprises a micro electro-mechanical system (MEMS) that comprises a cantilever beam with a proof mass (or seismic mass) positioned within a gas sealed environment that provides for damping. Under the influence of external acceleration the proof mass deflects from its neutral position. This deflection can be measured in an analog or digital manner. In one arrangement, the capacitance between a set of fixed beams and a set of beams attached to the proof mass is measured. In another arrangement, piezoresistors can be integrated into the springs to detect spring deformation. As is know in the art, most accelerometers operate in-plane, that is, they are designed to be sensitive only to a direction in the plane of the device. By integrating two devices perpendicularly on a single plate a two-axis accelerometer can be made. By adding an additional out-of-plane device three axes can be measured. Those of the skill in the art will recognize other embodiments of the accelerometer 200 that can be used in light of the disclosure herein.

As shown in FIG. 3, the accelerometer 200 can connect to the probe mount 101 through a bus line 109, allowing information from the accelerometer to be transmitted from the probe 32 to the PCMM 10 as well as any other desirable units or sub-components. Accordingly, the accelerometer 200 can be operatively connected to other elements of the PCMM 10 such as the devices for measuring rotational position described above. In some embodiments the operative connection can be direct, with a signal passing from the accelerometer 200 to the sub-components unaltered. In other embodiments the operative connection can be indirect, perhaps passing through a processor (described below) that may alter the signal or generate a new signal to pass to the sub-components at least partially dependent on a signal from the accelerometer 200. In further embodiments, the operative connection can be indirect, passing through a series of intermediate components.

In this embodiment, being proximal to the probe tip 108, the accelerometer 200 can advantageously detect vibrations on or from the probe tip 108. For instance, in some embodiments the accelerometer can be rigidly attached to the probe tip 108, either directly or indirectly. Such rigid attachment can minimize damping of vibrations propagating from the probe tip 108 to the accelerometer 200. Further, the accelerometer 200 can be connected in such a manner that minimizes continuing vibrations after an initial acceleration of the probe tip 108. For example, in some embodiments the accelerometer 200 can be directly supported, and not cantilevered or suspended.

The accelerometer 200 can be configured to measure vibrations in a variety of directions, including three translational and three rotational directions. However, in some embodiments fewer vibrational directions can be detected. For example, as rotational vibrations may be less significant in operation, in some embodiments only the three translational vibrations can be measured. Further, in some embodiments a simplified accelerometer 200 may be desired, in which case only translational vibrations parallel to the probe neck 105 can be measured. More generally, the vibrations measured can vary depending on the intended use of the PCMM 10.

Upon detection of a vibration, the accelerometer 200 can indicate this activity to the PCMM 10, and thus trigger a measurement of the position of the probe tip 108. As described above, in response to a trigger, the rotational degree of the articulation members 40, 42, 44, 46, 48, 50 can be recorded and/or taken. In some embodiments the accelerometer can provide this indication directly to e.g. encoders associated with the articulation members. In other embodiments, the indication can be provided indirectly, e.g. via a processor on the probe 32 (discussed further below) or some other device on the PCMM 10. In further embodiments, the encoders can be continuously outputting a rotational position to a separate processor, which is also operatively connected to the accelerometer 200. In this case, the accelerometer can trigger the recording of desired data such as rotational position.

As the probe 32 will experience vibrations and accelerations even without contacting an object to be measured, the accelerometer 200 (and possibly associated devices) can indicate contact only under particular circumstances. For example, in some embodiments the probe 32 can be configured to indicate contact when the accelerometer 200 measures an acceleration of at least a particular threshold amplitude. In other embodiments, the probe 32 can indicate contact when the acceleration changes by a particular amount in a particular amount of time (e.g. a threshold jerk). Further, in some embodiments a threshold duration of the acceleration or jerk can be required for the probe 32 to indicate contact. For example, in some embodiments only accelerations or jerks with a sufficiently long duration indicate contact (minimum duration). Similarly, in some embodiments the acceleration or jerk must end (or decline) after a certain duration of time (maximum duration). Even further, in some embodiments a second contact can only be indicated after a certain cooldown time has passed since the last indicated contact (cooldown duration). The particular requirements for indication of contact can be varied depending on the intended use of the PCMM 10. For example, if the PCMM 10 is automated then the probe 32 can be configured to take into account the actual or possible movement of the PCMM 10, and accordingly ignore accelerations and vibrations caused solely by this movement. If the PCMM 10 is manually operated, it can be similarly configured in light of the different expected movements. For example, the probe 32 can be configured to ignore vibrations caused by the pressing of a button 66. Notably, the pressing of one of said buttons 66 can also signal the probe 32 to begin monitoring for vibrations from contact. In further embodiments, the probe 32 can be configured to ignore vibrations caused during periods of substantially continued high vibrations that can reduce accuracy (as the PCMM can be calibrated under quasi-static conditions). More generally, in some embodiments the criteria for indicating contact can be configured to check for a new vibration, distinct from other ongoing vibrations.

In one particular example, two acceleration measurements taken close together in time can be compared. If the magnitude of the difference in the two acceleration measurements is above a specified threshold, then the probe 32 can indicate contact. In even more specific examples, the difference in accelerations can be a difference in measured acceleration vectors, and the magnitude of the difference can be the norm of the difference. However, in other embodiments the differences in acceleration can be analyzed differently, such as by summing the absolute values of the change in acceleration in each component direction. The threshold level and the time interval between measurements can vary with the PCMM 10, the probe 32, and their intended use. In some embodiments the comparison can be implemented in hardware where, for example, one acceleration measurement is delayed and the two accelerations are compared by a comparator circuit.

Advantageously, a probe 32 that is triggered by such vibrations can, in some embodiments, have no moving parts. In other embodiments, the probe 32 can have fewer moving parts. For example, in the embodiments described herein the probe 32 can optionally lack a vibrator or some other device that purposefully initiates vibrations in the probe 32 or PCMM 10 (independent of contact vibrations). The reduction in moving parts can make the probe 32 less expensive to produce and more reliable over the lifetime of the probe 32. Further, in the embodiments of the probe 32 described herein, the probe 32 can optionally operate as a standard hard contact probe when operated in a different mode, possibly controlled by modules or devices on the probe 32 or elsewhere on the CMM 10, as further described below.

Figure 3A:
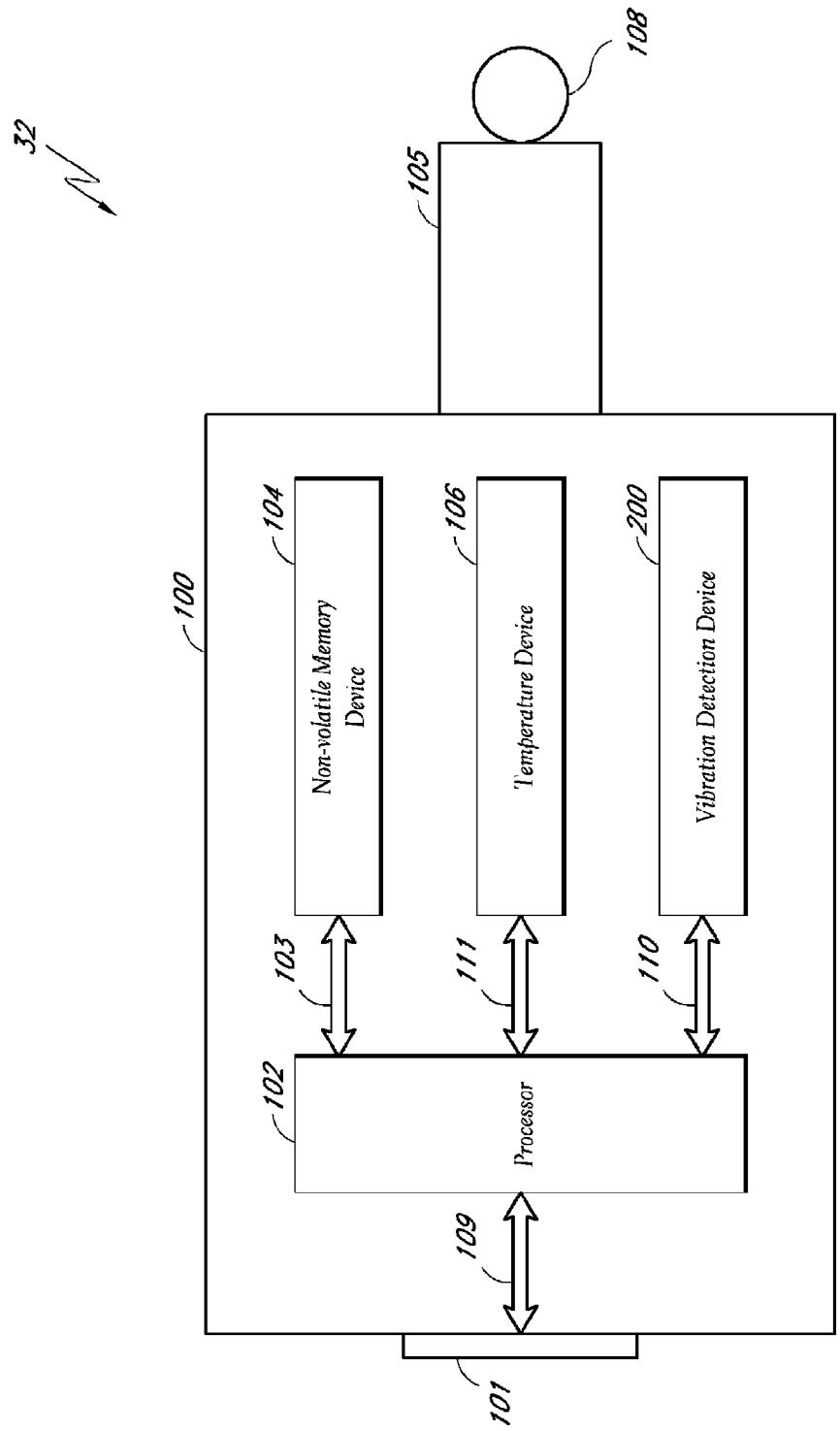
FIG. 3A is a schematic illustration of an embodiment of a probe for the CMM of FIG. 1 or 2.

FIG. 3A depicts another embodiment of a probe 32, similar to that depicted in FIG. 3 and with the optional variations described relative thereto, except where otherwise stated. As depicted, the carriage 100 can also include several modules configured, for example, to provide data uniquely identifying the probe 32, facilitate calibration of the probe with the PCMM 10, etc. The probe carriage 100 comprises a processor 102, a solid-state memory device 104, a temperature sensor 106, and an accelerometer 200. The solid-state memory device 104, the temperature sensor 106, and the accelerometer 200 are connected to the processor 102 using bus lines 103, 111, 110 respectively.

In some embodiments, the processor 102, memory 104, temperature sensor 106, and accelerometer 200 may all be integrated in one chip. In other embodiments, they may be separate components mounted on a circuit board or electronically coupled, such as with a wired connection. In other embodiments, only one, two, or three of the components may be present and others not required.

The bus line 109 can connect the processor 102 to the probe mount 101 such that any information obtained by the processor 102 from the solid-state memory device 104, the temperature sensor 106, and the accelerometer 200 is transmitted from the probe 32 to the PCMM 10 to which the probe 32 is attached. In one embodiment, the PCMM 10 can use the transmitted information to calibrate the probe 32 with the PCMM 10. In another embodiment, the PCMM 10 can retransmit the obtained information to a general purpose computer (not shown) configured to calibrate the probe 32 with the PCMM 10. In another embodiment, the PCMM 10 can use the information the PCMM obtains from the processor 102 to retrieve calibration or nominal data related to the probe 32 that is stored in a different media such as a memory key, hard disk, or a computer, as will be further described below. In further embodiments, as discussed above, the PCMM 10 uses the information to indicate contact with an object to be measured and accordingly measures the position of the probe tip 108 at that time.

As illustrated in FIG. 3A, the processor 102 in one embodiment is a general purpose central processing unit (CPU) configured to control operations of various modules of the probe 32, including the solid-state memory device 104, the temperature sensor 106, and accelerometer 200. Other examples of processors could include, but are not limited to, separate or individual processing cores, separate or distributed processing logic, general purpose processors, special purpose processors, application specific integrated circuits (ASICs) with processing functionality, memory controllers, system controllers, etc. As shown in FIG. 3A, the processor 102 can be connected to the solid-state memory device 104 through bus line 103, the temperature sensor 106 through the bus line 111, and the accelerometer 200 through bus line 110. In one embodiment, the processor 102 is configured to control the operation of the solid-state memory device 104, the temperature sensor 106, and the accelerometer 200 using connections 103, 111 and 110. In another embodiment, the processor 102 controls the solid-state memory device 104, for example, by sending instruction to read a particular address in the solid-state memory device 104 and receiving a data signal from the solid-state memory device 104 corresponding to the address sent by the processor 102. In some embodiments, the processor 102 transmits the data it receives from the solid-state memory device 104 to the PCMM 10 using the bus line 109. In another embodiment, the processor 102 obtains a temperature reading from the temperature sensor 106 using the bus line 103 and transmits the temperature reading to the PCMM 10 using the bus line 109. In other embodiments, data transfer to and from the processor 102 can be made wirelessly using a wireless data transmission protocol.

The solid-state memory device 104 can be capable of accepting data, storing the data, and subsequently providing the data. The solid-state memory device 104 as illustrated in FIG. 3A depicts a non-volatile electrically erasable programmable read-only memory (EEPROM) device. The processor 102 or another memory controller can selectively write or erase any part of the EEPROM without the need to write or erase the entire EEPROM. Although EEPROM is preferably used in connection with the probe 32 in the various embodiments contained herein, the probe 32 can be configured to comprise any suitable non-volatile electronic data storage device, including, but not limited to, tape, hard disk, optical disk, Flash memory, programmable read-only memory (PROM), erasable PROM (EPROM), etc. In one embodiment, the sold-state memory device 104 is an EEPROM device comprising a 48-bit laser etched serial number. As previously mentioned, the processor 102 can be configured to control the operation of the solid-state memory device 104 by sending control signals through the control lines 103, such as, for example, instructions for the solid-state memory device 104 to write data transmitted through a data bus (not shown) to a memory cell address sent through the address bus (not shown). In certain embodiments, the processor 102 controls the operation of the solid-state memory device 104 using separate system and memory controllers (not shown).

Still with reference to FIG. 3A, the solid-state memory device 104 in one embodiment can be configured to include a unique serial or product number, machine readable data that uniquely identifies the particular probe 32 on which the solid-state memory device 104 is located. The unique serial number allows individual serialization of all of the improved probes to advantageously allow subsequent identification of each one of the probes 32. In certain embodiments, the unique serial number can even identify individual probes 32 that belong to the same type or category. For example, in some embodiments the solid-state memory device 104 can include information identifying it as including a vibration detection device 200.

A solid-state memory device 104 comprising a machine readable unique serial number identifying the probe 32 has several advantages. As previously mentioned, if the probe 32 is mounted to the PCMM 10 for the first time, or if a new probe 32 is used for the first time, the probe 32 must be calibrated with the PCMM 10. Each probe 32 has nominal data relating to characteristics of the probe 32, such as, for example, length, category, type, offsets, width, thickness, etc. that is usually contained in different media such as disks, memory keys, etc. This nominal data is used as a starting point to calibrate the probe 32 with the PCMM 10. In some embodiments, the nominal data is stored in a computer that is connected to the PCMM 10. In other embodiments, the nominal data is stored in a storage area located on the PCMM 10. In yet other embodiments, the nominal data for the probe 32 is stored in a different storage media along with the machine readable unique serial number for that particular probe 32. During the calibration process, the PCMM 10 can obtain the nominal data for the probe 32 by first reading the machine readable unique serial number from the probe 32 and obtaining the nominal data located on different media which contains the same unique serial number. As such, the machine readable unique serial number identifying the probe 32 can be used to better match the probe 32 with the corresponding nominal data stored on a different media than conventional systems, some of which do not distinguish probes 32 of the same type or category.

Further in other embodiments, the machine readable serial number uniquely identifying the probe 32 can be used to match calibration data with the probe 32. When the PCMM 10 calibrates the probe 32, the result can be data that provides translation from the end of the PCMM 10 to the tip of the probe 32. In further embodiments, the calibration data can indicate vibration characteristics between the PCMM 10 and the probe 32, such as the propensity for vibrations to propagate between the two, vibrations created by the contactless movement of the PCMM 10, and other characteristics. The calibration data can therefore be unique to the particular PCMM 10 and probe 32 combination. As with nominal data, the calibration data is also typically stored in media different from the coordinate acquisition device 30, such as, for example, a memory key, hard disk on a computer, or storage area located on the PCMM 10, etc. In some embodiments, the PCMM 10 stores the calibration data for a probe 32 on the different media along with the machine readable serial number of the particular probe 32. When the probe 32 is remounted to the PCMM 10, the PCMM 10, as with the nominal data described above, can obtain the calibration data that is specific to the probe 32 from the different media by first reading the machine readable unique serial number from the probe 32 and obtaining the calibration data that contains the same serial number.

Although the machine readable serial number is stored in the solid-state memory device 104 in the previously disclosed embodiments, the machine readable serial number in other embodiments can be located elsewhere on the probe 32. In some embodiments, the serial number is located on another module located in the probe carriage 100, such as, for example, the processor 102. In other embodiments, the machine readable serial number can be provided by an integrated package of software and/or hardware similar to systems used in warehouse operations, such as, for example, bar codes and RFID tags.

In still other embodiments with respect to FIG. 3A, the solid-state memory device 104 can be configured to store nominal data. In one embodiment, the processor 102 stores the nominal data relating to physical characteristics of the probe 32 into the solid-state memory device 104, for example, using the control line 103. The nominal data can be written in the solid-state device 104 during the manufacture stage of the probe 32. In other embodiments, nominal data is written into the solid-state memory device 104 after the probe 32 is assembled, for example, using a general purpose computer configured to write nominal data into the solid-state memory device 104. In some embodiments, an RFID tag on the probe 32 can store the machine readable serial number and/or nominal data. The PCMM 10 can wirelessly retrieve the serial number and/or nominal data from the RFID tag. In other embodiments, communication between the CMM and probe can occur through other wireless protocols, such as WiFi, Bluetooth, or RF. In still other embodiments, the PCMM 10 first reads the machine readable unique serial number from the solid-state device 104, then obtains the nominal data based on the machine readable unique serial number, for example from a different media such as a memory key or another computer, and stores the nominal data into the solid-state device 104 such that the probe 32 will retain nominal data for use in subsequent calibrations. A solid-state memory device 104 configured to store nominal data eliminates the need to maintain a separate media to store nominal data, thereby reducing the difficulty of managing large number of probes and their associated nominal data.

Still with reference to FIG. 3A, the probe 32 can use the temperature sensor 106 to measure the temperature of the probe 32 and provide the temperature information to the PCMM 10. As illustrated in FIG. 1, the position of the probe 32 in space at a given instant can be calculated if the length of each transfer member 24, 26, and 28 and the length of the probe 32 are known. The length and other physical parameters of the probe 32 can be obtained by the PCMM 10 during calibration, for example, by reading nominal data from the solid-state memory device 104. However, the length of the probe 32 may change, for example, by expanding in response to an increase in temperature. In some embodiments, the transfer members 24, 26, and 28 of the PCMM 10 and the probe 32 are composed of different material with different heating coefficients and, therefore, expand and/or contract in response to temperature at a different rates. In other embodiments, the transfer members 24, 26, and 28 and the probe 32 are composed of the same material but expand and/or contract at a different rate because the temperature of the probe 32 can be different from temperature of the PCMM 10, for example, due to the heat generated within the PCMM 10.

The PCMM 10 can use the temperature sensor 106 to compensate for the expansion or contraction of the probe 32 due to changes in temperature. In one embodiment, the solid-state memory device 104 contains nominal data related to the temperature characteristics of the probe 32, such as, for example, heating coefficient information, length at a certain default temperature, etc. At any given time, the PCMM 10 can obtain the temperature of the probe 32 from the temperature sensor 106, obtain the coefficient of thermal expansion of the probe 32 from the solid-state memory device 104, and calculate any changes in the physical characteristics of the probe 32 using the obtained temperature and the coefficient of thermal expansion of the probe 32. In some embodiments, the temperature of the probe 32 and the coefficient of thermal expansion of the probe 32 are transmitted, for example by the processor 102, to a general purpose computer attached to the PCMM 10 in order to calculate the changes in physical characteristics of the probe 32. In other embodiments, the PCMM 10 or the general purpose computer obtain the coefficient of thermal expansion of the probe 32 from a different media, such as, for example, a memory key, a disk, a database, etc. In other embodiments, the PCMM 10 and/or general purpose computer use the unique machine readable serial number of the probe 32 to obtain the appropriate coefficient of thermal expansion of the probe 32 from the different media. Compensating for the expansions or contractions of the probe 32 due to changes in temperature using the temperature sensor 106 in the above-described manner eliminates the need for the PCMM 10 to recalibrate the probe 32 in response to temperature effects. Further, other changes to the probe 32 can be computed from changes in temperature, such as the behavior of sensors such as the vibration detection device 200.

Further, as discussed above in regard to detection of contact with an object to be measured, the processor 102 can be configured to determine whether a given signal from the vibration detection device 200 should be considered to indicate contact. The various possible rules described above can be inputted into the processor 102 as software or hardware. In some embodiments the processor 102 can further calibrate the rules for contact detection by continuously examining the output of the vibration detection device 200 during movement of the PCMM 10 absent contact, for example during a vibration calibration procedure. The vibration calibration procedure can involve movement of the PCMM 10 in a manner similar to that during normal operation, absent actual contact with any object. This can be used to appropriately set the various thresholds and other possible contact detection parameters such as those described herein.

Although the probe 32 of FIG. 2 comprises the processor 102, solid-state memory device 104, temperature sensor 106 and accelerometer 200 as separate modules located on the probe carriage 100, other configurations are possible. For example, some or all of the modules the processor 102, solid-state memory device 104, temperature sensor 106 and accelerometer 200 may be located on a different area of the probe 32 or the PCMM 10 (as further described below). Further still, the probe 32 may comprise modules that combine the functions of one or more of the processor 102, solid-state memory device 104, temperature sensor 106 and accelerometer 200.

Other configurations not explicitly mentioned above or herein are also possible. For example, in some embodiments additional coordinate sensors can be included on the coordinate acquisition member 30, and can also be associated with the above described devices and modules. Similarly, additional sensors can be included to monitor the state of various portions of the PCMM 10. Further devices and modules, and the arrangement and use thereof, is described in U.S. patent application Ser. No. 12/057,918, filed Mar. 28, 2008, which is incorporated herein by reference in its entirety as stated above.

FIG. 4 depicts another embodiment of an improved probe 32. As depicted, the vibration detection device 200 can be located within the probe tip 108. As the vibration detection device 200 is further distanced from the probe mount 101, they can connect via two bus lines in series 109A, 109B. The embodiment depicted in FIG. 4 can have similar features to the embodiments depicted in FIGS. 3 and 3A, and can operate in a similar manner and with the optional variations described relative thereto, except where otherwise stated. In particular reference to the details of the embodiment in FIG. 3A, in a preferred embodiment the vibration detection device 200 can be separated from the other modules and devices where, as depicted, it is located within the probe tip 108. However, in other embodiments each of the devices and modules can be held within the probe tip.

FIG. 5 depicts another embodiment of a probe 32, again similar to the embodiments depicted in FIGS. 3 and 3A and with the optional variations described relative thereto, except where otherwise stated. As depicted, the vibration detection device 200 can be located within the probe mount 101. Accordingly, the vibration detection device 200 can be generally separate from the probe 32, as in some embodiments the probe 32 can detach from the probe mount 101 and the PCMM 10. Accordingly, the PCMM 10 can detect vibrations even when using standard prior art probes that lack a vibration detection device (e.g., a hard probe). Similarly, where the vibration detection device 200 is on the probe 32, the probe 32 can be used with prior art PCMM arms to detect vibration.

Generally, moving the vibration detection device 200 further from the tip 108 can advantageously reduce error and delay in the transmission of the signal therefrom, as the signal does not travel as far. However, the greater distance between the vibration detection device 200 and the probe tip 108 can increase the error between the measured vibrations and the actual vibrations at the tip.

Although the above-disclosed embodiments of the present teachings have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments, combinations, sub-combinations and/or uses and obvious modifications and equivalents thereof. Accordingly, the invention is not intended to be limited by the specific disclosures of preferred embodiments herein.

What is claimed is:

1. A articulated arm system comprising:
   an articulated measuring arm comprising a plurality of interconnected support arm segments moveable about a plurality of axes;
   a plurality of rotational angle sensors mounted on the articulated measuring arm configured to measure rotational position between the support arm segments; and
   a vibration detection device attached to the articulated measuring arm near an end of the articulated measuring arm, the vibration detection device being operatively connected to the sensors such that the sensors will output a rotational position upon detection of a new vibration exceeding a threshold amplitude.

2. The system of claim 1, further comprising a coordinate acquisition member at an end of the articulated measuring arm.

3. The system of claim 2, wherein the vibration detection device is disposed on the coordinate acquisition member.

4. The system of claim 2, wherein the coordinate acquisition member comprises a hard probe.

5. The system of claim 4, wherein the coordinate acquisition member further comprises a device for detecting position and/or contact distinct from the vibration detection device.

6. The system of claim 1, wherein at least one of the sensors is an optical encoder.

7. The system of claim 1, wherein the vibration detection device is disposed on the articulated measuring arm.

8. The system of claim 2, wherein the coordinate acquisition member is removable.

9. The system of claim 2, wherein the vibration detection device is disposed within the coordinate acquisition member.

10. The system of claim 4, wherein the vibration detection device is disposed within the hard probe.

11. The system of claim 2, wherein the vibration detection device is rigidly attached to the coordinate acquisition member.

12. The system of claim 1, wherein the vibration detection device is an accelerometer.

13. The system of claim 3, wherein the coordinate acquisition member comprises a probe tip and the vibration detection devices is disposed within the probe tip.

14. A method of operating an articulated arm system comprising:
    contacting an item to be measured with an articulated measuring arm comprising a plurality of interconnected support arm segments moveable about a plurality of axes;
    sensing a new vibration at an end of the measuring arm upon contact with the item;
    generating a triggering signal in response to the new vibration; and
    automatically measuring a position of the end of the measuring arm in response to the triggering signal.

15. The method of claim 14, wherein the triggering signal indicates contact with the item.

16. The method of claim 14, further comprising the step of storing the measured position.

17. The method of claim 14, wherein the step of measuring further comprises storing the measured position.

18. The method of claim 14, wherein the step of automatically measuring is performed with an electronic encoder.

19. The method of claim 14, further comprising the step of determining whether a sensed new vibration indicates contact with the item.

20. The method of claim 19, wherein the step of determining further comprises checking for a threshold amplitude.

21. The method of claim 19, wherein the step of determining further comprises checking for a minimum duration of an acceleration.

22. The method of claim 19, wherein the step of determining further comprises checking for a maximum duration of an acceleration.

23. The method of claim 19, wherein the step of determining further comprises ignoring vibrations during periods of substantially continued high vibrations.

24. The method of claim 19, wherein the step of determining further comprises checking for passage of a cooldown duration.

25. A probe configured for use with a coordinate measurement machine comprising:
    a probe tip comprising an accelerometer;
    a probe neck connecting the probe tip to a probe body; and
    a mounting portion configured to mount the probe body to a coordinate measuring machine, the mounting portion comprising a connect device and a data port.

26. The probe of claim 25, wherein the accelerometer and data port are configured to output a trigger signal upon detection of a new vibration exceeding a threshold amplitude.

27. The probe of claim 25, further comprising a device for detecting position and/or contact distinct from the accelerometer.

28. The probe of claim 25, wherein the probe tip is a hard probe tip.

* * * * *